(12) United States Patent
Lokshin et al.

(10) Patent No.: US 6,748,323 B2
(45) Date of Patent: Jun. 8, 2004

(54) DISPLAYING DATA

(75) Inventors: Anatole Lokshin, Claremont, CA (US); Sergey V. Portnov, Saint-Petersburg (RU); Yuriy A. Panov, Saint-Petersburg (RU); Mikhail V. Koroteev, Saint-Petersburg (RU)

(73) Assignee: Thales North America, Inc., Santa Clara, CA (US)

( * ) Notice: Subject to any disclaimer, the term of this patent is extended or adjusted under 35 U.S.C. 154(b) by 3 days.

(21) Appl. No.: 10/208,261

(22) Filed: Jul. 31, 2002

(65) Prior Publication Data

US 2004/0024526 A1 Feb. 5, 2004

(51) Int. Cl.$^7$ ................................................ G01C 21/00
(52) U.S. Cl. ........................ 701/213; 701/207; 701/208; 345/418; 345/419
(58) Field of Search ................................ 701/213, 200, 701/208, 207; 345/418, 419, 425, 426, 427, 420, 422

(56) References Cited

U.S. PATENT DOCUMENTS

| 5,764,807 | A | * | 6/1998 | Pearlman et al. | 382/240 |
| 5,902,347 | A | * | 5/1999 | Backman et al. | 701/200 |
| 6,023,278 | A | * | 2/2000 | Margolin | 345/419 |
| 6,177,943 | B1 | * | 1/2001 | Margolin | 345/419 |

* cited by examiner

Primary Examiner—Marthe Y. Marc-Coleman
(74) Attorney, Agent, or Firm—Lowe Hauptman Gilman & Berner, LLP (57) ABSTRACT

A technique for displaying topographical data, for example, on a screen of a portable hand-held device includes: optionally receiving GPS (Global Positioning System) signals and generating a digital output indicative of a position location of the display device in response to the received GPS signals or inputting location data manually to produce an image on a display screen of the device in response to the digital output; and storing true digital elevation data as compressed cells and decompressing on-the-fly only data needed to provide elevation data for an image area displayed on the display screen.

108 Claims, 5 Drawing Sheets

DISPLAYING DATA

BACKGROUND OF THE INVENTION

1. Field of the Invention

The present invention relates to a method and apparatus for displaying data, such as topographical data, and to a computer program for enabling display of such data. More particularly, the present invention relates to displaying data, such as topographical data, for efficient representation of data in a low-cost portable hand-held device.

2. Description of the Related Art

Portable mapping devices such as GPS (Global Positioning System) and PDAs (Personal Digital Assistants) are capable of displaying and manipulating digital maps. In addition to the roads, streets, rivers, lakes and other geographic features, these maps often display topographical information as well. However, topographical information is presented only as a set of topographical lines similar to the one that are used in conventional paper topographical maps. Therefore, a true value of the terrain elevation is known and stored only for the topographical lines that are stored for the map, e.g.—Garmin Hand-Held GPS Vista device. This makes it difficult to compute elevation at other points or to create new topographical lines for the elevation levels that are not pre-stored for the map. This also requires a large data storage if topographical lines with a high resolution are required.

At the same time, digital technology allows one to store in a computer and to manipulate a true 3D (3 Dimensional) digital elevation model where the elevation of any terrain point can be computed. However, up to now, such systems were available only for use with powerful PC (Personal Computer) machines having a lot of memory and significant processing power, e.g.—DeLorme Topo USA PC product.

U.S. Pat. No. 5,902,347, to Backman et al. and entitled Hand-held GPS-mapping Device, discloses a hand-held GPS mapping device containing a GPS receiver, a database capable of storing vector or bit-mapped graphics, a viewing port, an embedded processor, a simplified user interface, a data compression algorithm, and other supporting electronics.

U.S. Pat. No. 5,902,347, to Backman et al. discloses two features, namely, a device that allows to view map images in the bright sun light and a device which divides a bit image of a topographical map by tiles and then compresses each tile with regular image compression algorithins such as TIFF (Tagged Image File Format).

The first device is not relevant to the present invention. As to the second device, while the abstract thereof mentioned vector maps, this is only to include such map images under the first device—having a screen that can be viewed outside. The tile compression method of the second device is applicable only to the bit map images—photo images, of the map, that is, so called raster maps.

The Detailed Description of U.S. Pat. No. 5,902,347, to Backman et al. describes in much detail how a photo image of a map is divided into tiles and then compressed with TIFF. There is no discussion about any digital maps. In fact, a digital map cannot be divided into tiles by simply cutting a whole map. A digital map is built out of tiles from the beginning and they are usually not compressed in a conventional sense but are bit encoded to provide a maximum speed of map reconstruction.

By the time of the issuance of U.S. Pat. No. 5,902,347, to Backman et al., there were several commercial handheld GPS systems capable of displaying vector maps on the device screen. One of such devices, Nav 6000, was produced by Magellan from 1996. These vector maps were constructed from the tiles.

The present invention is not concerned with a bit image or with a vector map. Rather, the present invention deals with Digital Elevation Model data, which is a quite different from both. DEM allows computing true elevation in any point of the map while a photo image of a map does not allow retrieving any digital information about features such as road direction or elevation, etc.

In addition, the present invention allows one to create tiles of different size with different resolution of data, which depend on the zoom level where these tiles are intended to be used. Image data cannot be simply thinned out so creation of tiles with different internal resolution of the data is impossible and is not even mentioned in U.S. Pat. No. 5,902,347, to Backman et al.

SUMMARY OF THE INVENTION

In accordance with one aspect of the present invention, a cell compression structure is utilized such that each cell can be decompressed independent of the others. Then, the data can be decompressed on-the-fly only for those cells that are needed to provide data for the area displayed on the screen of the device and only for the zoom levels that are currently used.

In accordance with another aspect of the present invention, elevation data, for example, is compressed using off-line processing. An asymmetrical compression algorithm is utilized so as to emphasize simplicity in the decompression of the data by providing most of the processing during the off-line data compression, thereby allowing the use of high-power computing devices to compress the data and allowing simple display devices having limited computing capabilities to decompress the data.

In accordance with still another aspect of the present invention, lossy compression is utilized to increase the data compression ratio. Both the average (rms) and maximum data compression error or the average (rms) and relative data compression error are controlled. The limitation on the absolute data compression error may be achieved by storing explicit corrections for the grid points where a good fit cannot be achieved with a desired level of data compression.

In accordance with another aspect of the present invention, data is decompressed and recomputed to a new grid, which is parallel to the screen and with a grid step, which is comparable with the screen size and resolution of a map presentation on the screen. This allows quick image rotation for the "track up" map orientation as well as providing better performance by effectively reducing the number of grid points to the minimum necessary for a given screen size and resolution.

In accordance with yet another aspect of the present invention, the topographical lines, for example, are computed on-the-fly using the screen reference grid of the new grid noted above. The elevation lines step is created on-the-fly and can either be user-specified or automatically determined from the map scale.

In accordance with another aspect of the present invention, the elevation value can be determined in real-time for any map location presented on the display screen.

Lastly, in accordance with still another aspect of the present invention, the user can view an elevation profile of a selected road, street, trail, track, or any other line feature and can view an elevation profile along the line of travel or perpendicular to the line of travel or at any arbitrary angle with respect to the line of travel and at any distance from the current position.

These and other objects of the present invention may be effected by providing a portable hand-held data display device comprising: a CPU (Central Processing Unit); an entry device, a memory, and at least one RAM (Random Access Memory), a map data storage device such as SD card or similar device, all operatively connected to said CPU; optionally, a GPS (Global Positioning System) unit, operatively connected to said CPU, to receive GPS signals and generate, with or without help of the CPU a digital output to said CPU indicative of a position location of said display device in response to said received GPS signals or a receiver to receive a digital output indicative of a position location to be displayed on said display device; and a video controller and a display screen, said video controller to receive signals from said CPU and to output signals to said display screen to produce an image on said display screen in response to said received signals from said CPU; wherein true digital elevation data, for example, is arranged to be stored as compressed cells in said memory, said CPU decompressing on-the-fly only data of cells needed to provide elevation data for an image area displayed on said display screen.

Note, that the current invention allows one to decompress and to display DEM data in a small hand-held device, such as PDA, that does not have direct position information from a GPS subsystem, internal or external. However, real time position information obtained from GPS allows the aforesaid device to decompress, to restore, and to display topographical data that is relevant to the actual user position without any direct intervention by the user. Otherwise, such a device can display only topographical information for the area explicitly selected by the user. Such area may or may not be related to the current position of the user.

Also note that a user of the device always has an option to directly command the device to display topographical information about an area of his/her choosing even if a GPS subsystem is present and active.

These and other objects of the present invention may also be provided by effecting a method of displaying data on a screen of a portable hand-held device, the method comprising: a optionally receiving GPS (Global Positioning System) signals and generating a digital output indicative of a position location of said display device in response to said received GPS signals or otherwise generating a digital output indicative of a location to be displayed on said display device to produce an image on a display screen of the device in response to said digital output; and storing true digital elevation data, for example, as compressed cells and decompressing on-the-fly only data needed to provide elevation data for an image area displayed on said display screen.

The these and other objects of the present invention may yet further be provided by effecting program storage device, readable by a machine and tangibly embodying a program of instructions executable by the machine to perform method steps for displaying data on a screen of a portable hand-held device, the method comprising: receiving GPS (Global Positioning System) signals and generating a digital output indicative of a position location of said display device in response to said received GPS signals or otherwise generating a digital output indicative of a location to be displayed on said display device to produce an image on a display screen of the device in response to said digital output; and storing true digital elevation data, for example, as compressed cells and decompressing on-the-fly only data needed to provide elevation data for an image area displayed on said display screen.

BRIEF DESCRIPTION OF THE DRAWINGS

The foregoing and a better understanding of the present invention will become apparent from the following detailed description of an example embodiment and the claims when read in connection with the accompanying drawings, all forming a part of the disclosure of this invention. While the foregoing and following written and illustrated disclosure focuses on disclosing an example embodiment of the invention, it should be clearly understood that the same is by way of illustration and example only and that the invention is not limited thereto. This spirit and scope of the present invention are limited only by the terms of the appended claims.

DETAILED DESCRIPTION

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/value/ranges may be given, although the present invention is not limited thereto. Still furthermore, any clock or timing signals in the drawing figures are not drawn to scale but rather, exemplary and critical time values are mentioned when appropriate. When specific details are set forth in order to describe example embodiment of the invention, it should be apparent to one skilled in the art that the invention can be practiced without, or with variations of, these specific details. Lastly, it should be apparent that differing combinations of hard-wired control circuitry and software instructions may be used to implement embodiments of the present invention, that is, the present invention is not limited to any specific combination of hardware and software.

Figure 1:
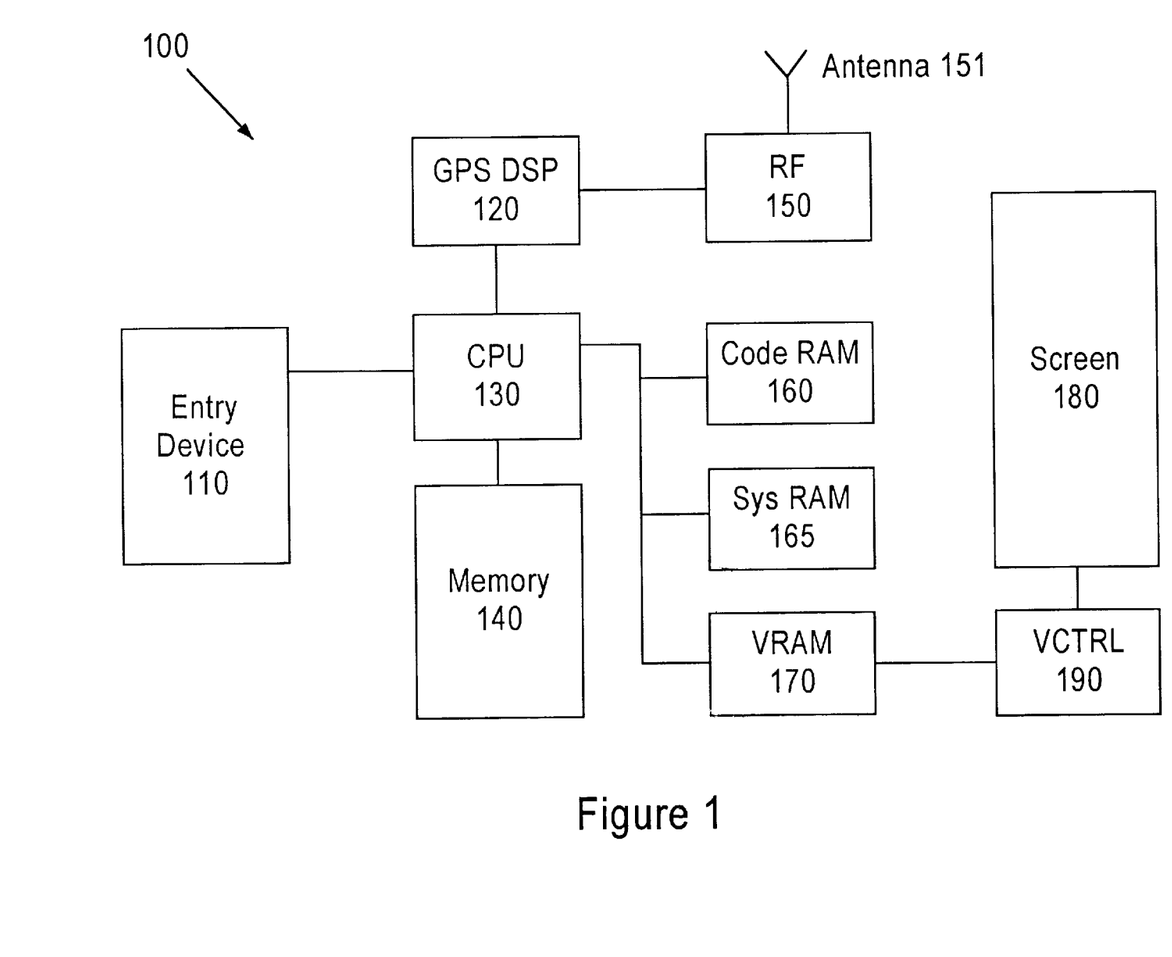
FIG. 1 is a block diagram that illustrates a hand-held GPS unit, which may be used in accordance with an embodiment of the topographical data display technique of the present invention.

FIG. 1 is a block diagram illustrating a hand-held GPS unit 100 which may be used in accordance with an embodiment of the topographical data display technique of the present invention. As illustrated in FIG. 1, an entry device 110, such as a keypad or touchpad, is connected to a CPU (Central Processing Unit) 130 of the hand-held GPS unit 100.

An antenna 151 is connected to an RF front-end 150 whose output is connected to a GPS DSP (Digital Signal Processor) 120. Radio frequency signals from a plurality of satellites (not shown) are received by the antenna 151 and processed by the RF front-end 150 and the GPS DSP 120.

The CPU 130, in addition to receiving an output from the GPS DSP 120, is connected to a memory card or other memory device 140, a code RAM (Random Access Memory) 160, a System RAM 165, and a VRAM (Video Random Access Memory) 170. The output of the VRAM 170 is fed to a VCTRL (Video Controller) 190, which in turn feeds the display screen 180, which is normally an LCD (Liquid Crystal Display) device.

In operation, data corresponding to a topographical map of a particular area is stored in a compressed form in the memory card 140.

The total amount of data is limited only by the capacity of the memory card 140. The area that is covered by the given amount of compressed topographical data is determined by the compression ratio of the data compression algorithm used. In the present invention, the compression ratio is effected by the resolution of the initial DEM data (size of the data grid step), the desired range of zooms when the topographical data needs to be presented, an acceptable level of data degradation—lossy compression, and a size of the screen. Since the present invention allows one to achieve a very high data compression ratio, it provides the largest area of coverage for a given memory card size.

The GPS DSP 120, in conjunction with the CPU 130 and the code RAM 160 and system RAM 165, determines the exact location of the hand-held GPS unit 100. The CPU 130, in conjunction with the memory card 140, code RAM 160, system RAM 165, VRAM 170 and VCTRL 190, display that portion of the stored topographical map including the exact location of the hand-held GPS unit 100 on the display screen 180. The various features of the present invention are discussed in detail below. These features may be effected with the hand-held GPS unit 100 illustrated in FIG. 1.

Topographic information is available in different digital data formats and provides coverage of large areas. The most common is a Digital Elevation Model where elevation values of the Earth surface are recorded and stored at the vertices of a regular grid, usually rectangular. This is the input elevation data format that is used by the present invention. Many other Digital Elevation formats can be converted into DEM by knowledgeable in the art by using many commercial tools, e.g. ArcView from ESRI. Such grids can take a lot of memory, and thus data compression is required even for desktop computers. High compression ratios can be achieved only by using lossy compression algorithms. That is, the restored decompressed elevations differ from the original ones.

To provide a fast local access to the compressed data, the original grid is divided into cells (relatively small rectangular pieces) such that each cell can be decompressed independently from the others. To the overall time that is required to restore elevation values for the area that is shown on the unit display the cell size is selected such that its size is comparable with the actual area that can be displayed at a particular range of zooms. Therefore, at most only 4 cells, for example, need to be decompressed for every screen for a particular range of zoom level. It is clear that digital map displays at different zoom levels can have different resolution of the underlying data. When a device displays 10 mi width across the screen, for example, the effective feature resolution that is available to the user is much less than when the same screen covers only a 100 m width across the screen. Therefore, to allow the same device to efficiently and quickly display topographical data for a large range of zoom levels, cells of different size and different resolution that cover the same area are used. For example, a cell with the most detailed resolution may be based on a topographical grid with 10 m grid steps and have 128×128 grid points. The next level of cells will have also 128×128 grid points but with a grid step of 100 m, and another level of cells will have the same number of points, but with a 1000 m grid step. Therefore, with the same speed of decompression, different cell levels cover area 100 times larger with an appropriate reduction in resolution of only 10 times.

There are many lossy image and data compression techniques that control average degradation of data quality by controlling RMS (Root Mean Square) value of the introduced data error. However, a compression of an elevation data also requires controlling the maximum compression/decompression error as well. Otherwise, a user can encounter deep ravines or steep cliffs that are not correctly shown on a decompressed topographical map, even though the RMS error value of the total compression is relatively small. Similarly, during compression of the depth data, it is important to control a relative error of compression, since an depth error of 10 m is not important at an depth of 1000 m but is very important at the actual depth of 10 m. In addition to the common procedure of controlling the RMS error value of lossy compression, the topographical data display technique in accordance with the present invention also controls the maximum and/or relative error of compression/decompression.

To provide good quality of compression, both the Root Mean Square Error (RMSE) and the maximum error must be controlled. The RMSE directly depends on the compression ratio, and a required RMSE can be obtained by changing the compression ratio. However, the value of the maximum error is quite arbitrary. After the desired RMSE has been obtained, all cell points are checked for deviation. If a deviation is greater than an acceptable level, the values of deviation and point positions are written into an archive. During decompression, the restored decompressed elevation data of a point is corrected by using deviation value stored in the archive.

The format of the correction values table can be as follows.

The table is written to the end of the each cell archive and consists of the deviations and coordinates of the points with the deviations equal or greater than d. The initial cells must be compared with the cells restored from the archive.

Let c be a counter of elements. Its value is initially 0. A linear search is effected (along the rows, over the whole cell) for elements with large deviations (that is, the absolute value s of the difference between the original elevation data and the restored data from the archive is greater than d). If s<d, then c is incremented and the search continues. Otherwise, c is written into the archive, then 2(s−d) if s>0, and 2(s+d)+1 else. After that, c is set to 0 and the process goes on.

The value of d is to be coordinated with the RMS error value, such that the number of points to be stored is small.

After a cell is decompressed, the additional correction table is checked, and if its size is >0 then the correction is applied to a decompressed cell. First, d is read from the archive. Then, on each step, values c and v are read. If v is odd, s=(v−1)/2−d, otherwise s=v/2−d. The pointer in the cell is moved to the c elements and s is added to the pointed element. The process goes on until the correction values are exhausted.

The correction algorithm can be performed for any lossy compression algorithm. The amount of information loss is usually controlled by the size of the resultant archive. One can obtain the required RMS error value by changing this size. An example of such an algorithm is disclosed in U.S. Pat. No. 5,764,807, issued Jun. 9, 1998, and entitled: Data Compression Using Set Partitioning In Hierarchical Trees.

Any data that is loaded into a nonvolatile memory of a portable device must be prepared off line and then used in real time. An important difference between the present invention and any other method is that other methods are generally symmetric in terms of processing complexity. Compression and decompression with the TIFF method takes about the same computing power. The only difference is that off-line, a large amount of data can be prepared while on-line only a small amount of data is decompressed at every given time. Therefore, while the total time that is required to compress or decompress the entire data set is about the same, user experience is positive since, due to the limitation of the viewing screen area, the user is working only with a small amount of data at every moment.

In the present invention, the amount of time and processing power that is used for compression and decompression of THE SAME tile of data is vastly different. Compression of each tile is done recursively many times to achieve the best possible compression ratio under the given limitation on error rms and maximum error. In particular, in the process of off-line compression, each tile is compressed and decompressed many times to make sure that the error rms is close to the allowed value but is not too small since a value smaller than the allowed rms value will produce a larger data set—that is, unnecessarily poorer compression. Also note, that since the corrections for the excessive errors are stored as an explicit list, there is a danger of having a very high compression ratio that is based only on rms values, only to have the total size of the archive too large because too many point corrections need to be stored to avoid having points with excessive errors.

Then, it is quite possible that by reducing the RMS value and, therefore slightly increasing the size of the compressed data, one however, can get rid of most of the large error points and, therefore, will reduce the overall size of the archive. Such an iterative nature of the compression algorithms makes it unsymmetrical but very well suited to be used on small hand-held devices with limited processing power.

An additional elevation buffer (grid) may be used to increase the processing speed and reduce the required memory size for small map scales. It is actually a sub-grid of the original grid. Its size should be greater than the size of any of the following requests. The number of nodes is fixed, and the step is chosen according to the intended zoom scales at which this grid will be used. The elevations of the nodes are exactly the same as for the corresponding original nodes. The elevation buffer scrolls over the map according to elevation requests. To reduce calculations it is organized as a torus. During scrolling only the origin of the buffer is shifted, but not the data itself. Thus, only new nodes are to be filled. This feature, in addition to the use of a cell compression structure where it each cell can be decompressed independent of the others, helps to increase the dynamic range of the zoom scales of data presentation without an undue increase in the processing speed of decompression.

A screen grid, in its turn, simplifies the topographical lines calculation, map turning, seamless lines drawing when the map scrolls and so on. Its sides are parallel to the screen. The step determines speed and quality of the topographical lines. A small step provides better quality, but slower speed. The screen grid should be larger than the screen itself (for scrolling). Note that the screen sides are not necessarily parallel to the sides of the cells (that is, the original grid), due to rotation. Moreover, after translation to original coordinates, the screen rectangle is generally transformed to a parallelogram (because of the fact that the x and y axes can be changed disproportionately, for example, being specified as longitude and latitude respectively).

Figure 2:
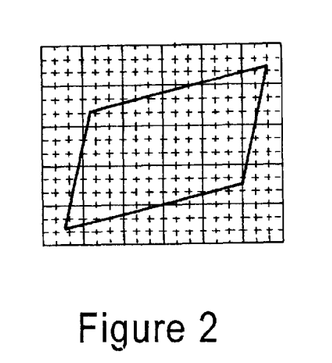
FIG. 2 is an illustration of the translation of a new grid to the original coordinates.

As illustrated in FIG. 2, the original grid in shown as dashed lines, the above-described intermediate grid in shown as thin black lines, and the screen grid border as thick black lines.

First, the elevation values of a decompressed cell are written to the intermediate grid and then the elevations of the screen grid are calculated using the intermediate grid. Let, the step of the intermediate grid mesh be a unit of measurement, and let the grid nodes coordinates (x, y) be integers. The elevation of the screen grid nodes can be calculated by the following elevation formula:

$$f(x,y)=(1.0-c_x)*(f([x],[y])*(1-c_y)+f([x],[y]+1)*c_y)+c_x*(f([x]+1,[y])*(1c_y)+f([x]+1,[y]+1)*c_y),$$

where $[z]$ denotes an integer part of z, $c_x=x-[x]$; $c_y=y-[y]$; and for integer $n_1$ and $n_2$ one denotes by $f(n_1, n_2)$ the elevation of a node $(n_1, n_2)$. This formula is uniquely defined by the following condition: elevations of nodes are kept unchanged and elevation values are linear along the coordinate lines within a mesh. The advantage of this formula is that it uses only the 4 nearest nodes of the grid.

Figure 3:
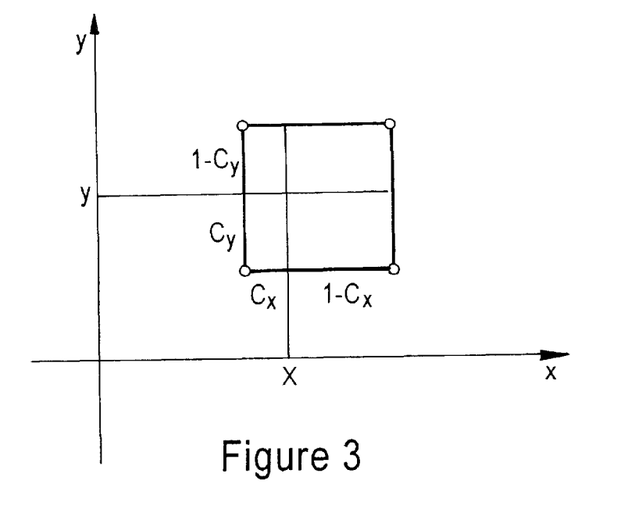
FIG. 3 is an illustration of the elements used in translating data to a new grid.

As shown in FIG. 3, the above-noted formula represents a hyperboloid surface on the mesh. There can be other surfaces (including quadrics) that are defined on the mesh and have the exact values on its corners.

Topographical lines (isolines, elevation or contour lines) are imaginary lines that join points of equal elevation on the surface of the land above or below a reference surface such as mean sea level. When referring to isolines, one usually means a family of isolines with elevations that are divisible by a step of isolines.

Figure 4:
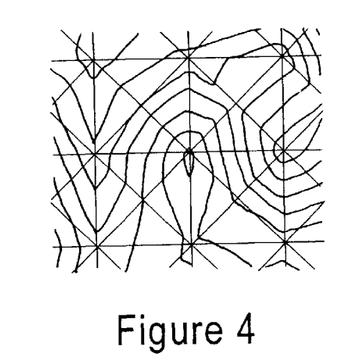
FIGS. 4 and 5 are illustrations of computing topographical lines.

With regard to building topographical lines using a grid of elevations, that is, the screen grid described above, each screen grid mesh is divided into 4 triangles by its central point. The elevation of the central point is supposed to be the average of the corner elevations. Elevation lines are built for each of the triangles independently (as if the terrain surface was consist of such flat triangles). The lines are parallel within the triangles and attach with each other on sides of adjacent triangles. This is illustrated in FIG. 4.

Isolines for the horizontal triangle are not displayed. For the rest of the triangles, elevations of the vertices are sorted in ascending order (in the picture, $A_1$, $A_2$ and $A_3$ have elevations $h_1$, $h_2$ and $h_3$ respectively, and $h_1<=h_2<=h_3$).

Figure 5:
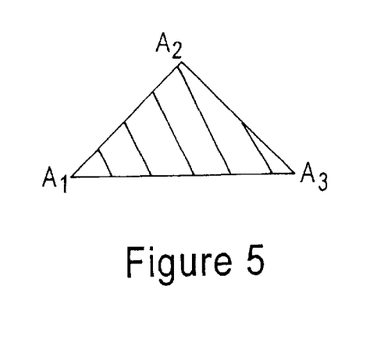

Then the isolines intersecting $A_1A_2$ and $A_1A_3$, are determined and then $-A_2A_3$ and $A_1A_3$. In both cases, it is necessary to calculate a ratio in which the isoline with elevation h, $h_1<=h<=h_3$ divides corresponding intervals. This is illustrated in FIG. 5.

The elevation value can be determined in real time for any map location, using the elevation formula noted above. To provide better consistency with elevation lines one can calculate the elevation using the screen grid and the same formula or to determine elevation using the triangulation technique described above. All these methods provide similar results.

As noted above, in accordance was an object of the present invention, the user can view an elevation profile of a selected road, street, trail, track, or any other line feature and can view an elevation profile along the line of travel or perpendicular to the line of travel or at any arbitrary angle with respect to the line of travel and at any distance from the current position.

Figure 6:
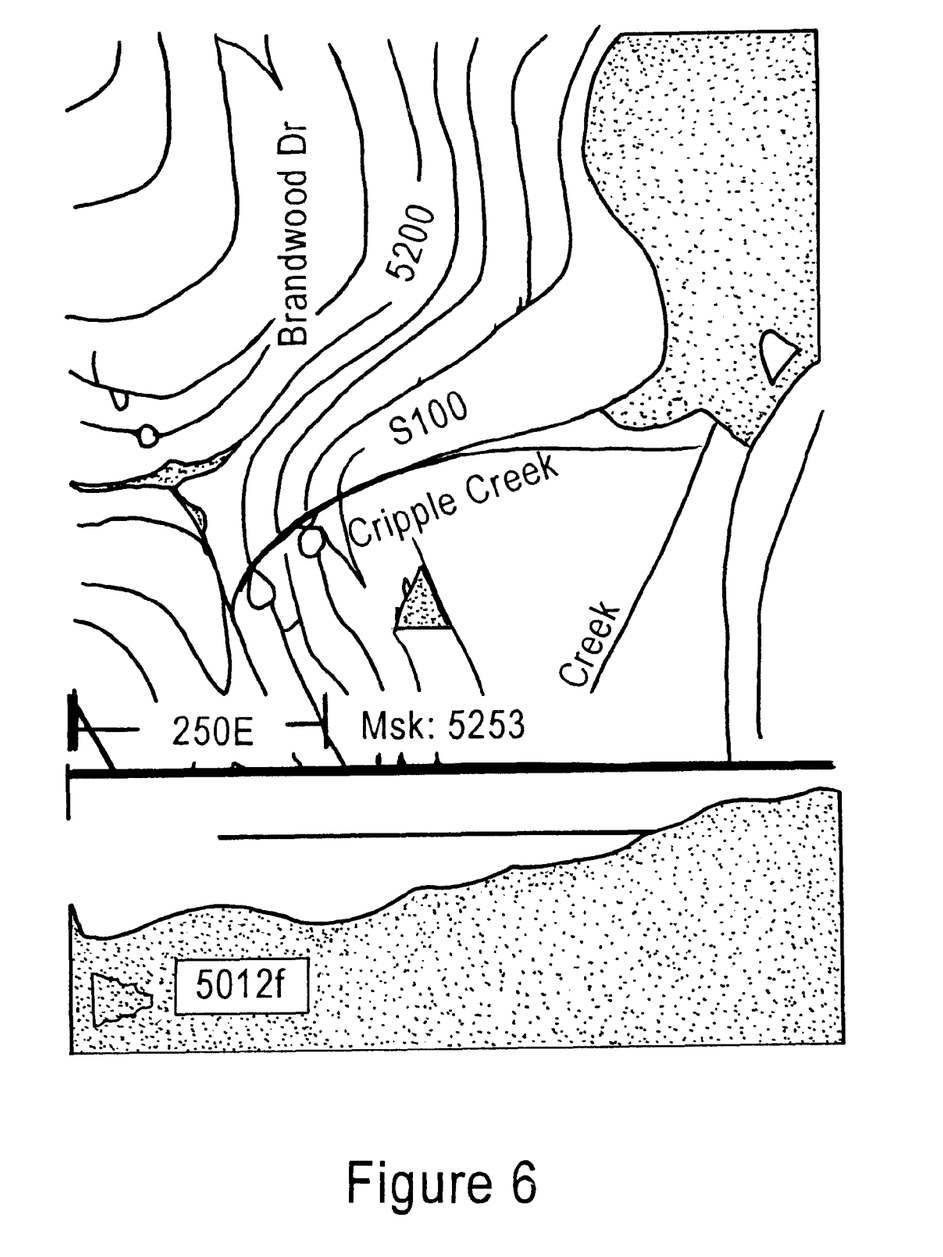
FIGS. 6–8 are illustrations of display screens for various elevation profiles.
Figure 7:
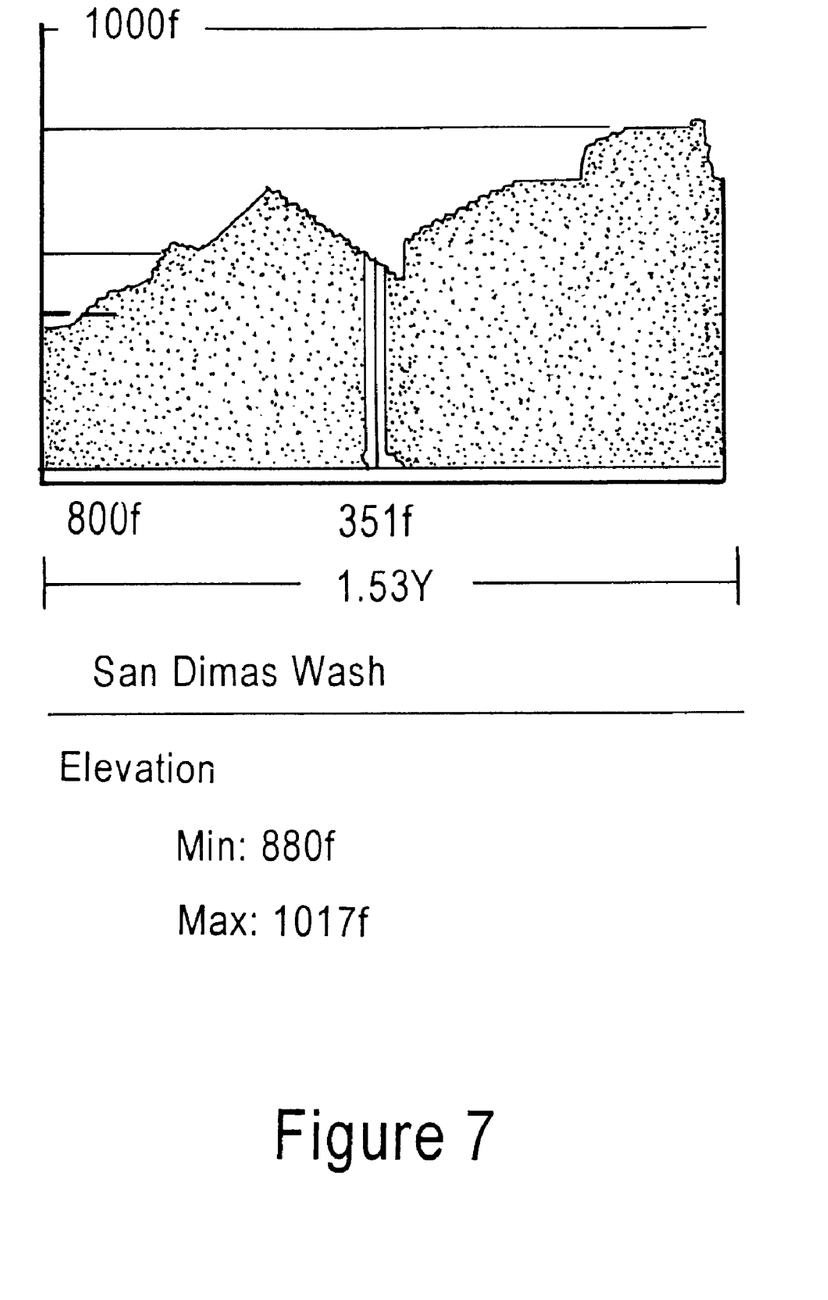
Figure 8:
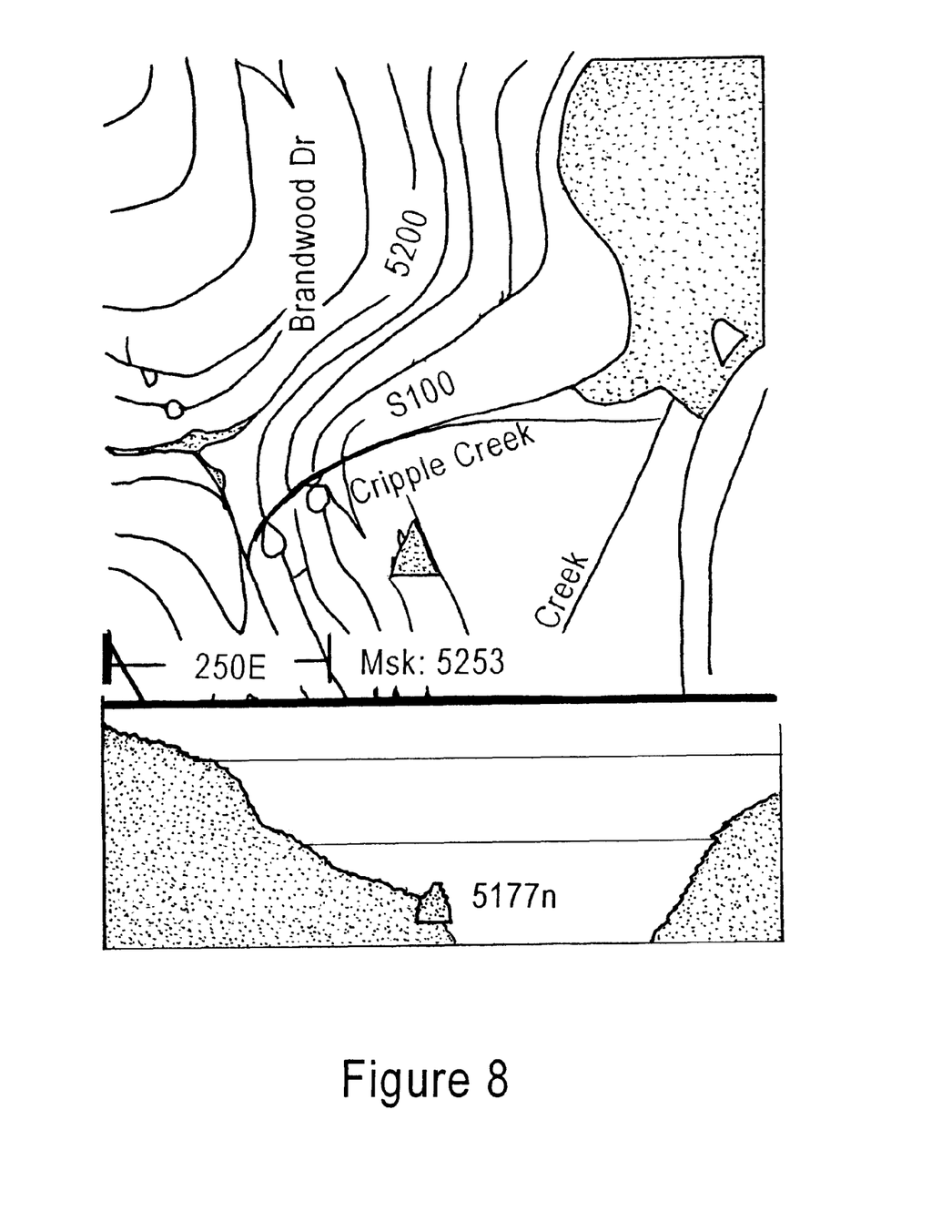

All of the elevation profiles noted above can be represented as a polygonal line. Such a line can be divided by a set of points to polygonal lines of equal length (this length should be small enough depending on the required profile resolution). Then one can calculate the elevation of each point from the set as noted above and build the graph of the profile. FIGS. 6–8 illustrate display screens for various elevation profiles.

This concludes the description of the example embodiment. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangements within the scope of the foregoing disclosure, the drawings, and the appended claims without departing from the spirit of the invention. In additions to variations and modifications in the component parts and/or arrangements, alternative uses will also be apparent to those skilled in the art.

What is claimed is:

1. A portable hand-held data display device comprising:
    a CPU (Central Processing Unit);
    an entry device, a memory, and at least one RAM (Random Access Memory), all operatively connected to said CPU;
    a digital data receiver arranged to input digital data to said CPU indicative of a position location to be displayed on a display screen; and
    a video controller and a display screen, said video controller arranged to receive signals from said CPU via said at least one RAM and to output signals to said display screen to produce an image on said display screen in response to said received signals from said CPU;
    wherein characteristic data is arranged to be stored as compressed cells in said memory, said CPU being arranged to decompress on-the-fly only data of cells needed to provide characteristic data for an image area displayed on said display screen and in accordance with a needed resolution and zoom level of said screen; and
    wherein a compression technique is such that an RMSE (Root Mean Square Error) of compression is below a preselected value.

2. The device of claim 1, wherein said characteristic data comprises digital elevation data.

3. The device of claim 2, wherein said display is arranged to display an elevation profile of one of a selected road, street, trail, or track or other line feature, said elevation profile being computed by said CPU utilizing said data stored in said memory.

4. The device of claim 2, wherein said display is arranged to display an elevation profile along a line of travel, said elevation profile being computed by said CPU utilizing said data stored in said memory.

5. The device of claim 2, wherein said display is arranged to display an elevation profile at a specified angle with respect to a line of travel and at a specified distance from said position location of said display, said elevation profile being computed by said CPU utilizing said data stored in said memory.

6. The device of claim 1, wherein said digital data receiver comprises a GPS (Global Positioning System) unit, operatively connected to said CPU, said GPS unit arranged to receive GPS signals and to generate and forward a digital output to said CPU indicative of a position location of said display device in response to said received GPS signals.

7. The device of claim 1, wherein said entry device is arranged to manually enter digital data to said digital data receiver, said digital data indicative of a position location to be displayed on said display screen.

8. The device of claim 1, wherein said characteristic data is arranged to be compressed off-line prior to being stored as compressed cells in said memory.

9. The device of claim 8, wherein the compression technique is asymmetrical such that significantly more processing occurs during off-line compression than occurs during decompression by said CPU in said device.

10. The device of claim 1, wherein said memory includes a correction values table for said stored compressed cells, said CPU being arranged for accessing said correction values table to correct the compressed cells values to limit absolute compression errors.

11. The device of claim 1, wherein said CPU is arranged to decompress characteristic data stored in said memory and to re-compute said characteristic data to a new grid parallel to a grid displayed on said display screen, said new grid having a grid step comparable with said screen size and resolution displayed on said display screen.

12. The device of claim 11, wherein said CPU is arranged to compute characteristic lines on-the-fly using said new grid.

13. A portable hand-held data display device comprising:
    a CPU (Central Processing Unit);
    an entry device, a memory, and at least one RAM (Random Access Memory), all operatively connected to said CPU;
    a digital data receiver arranged to input digital data to said CPU indicative of a position location to be displayed on a display screen; and
    a video controller and a display screen, said video controller arranged to receive signals from said CPU via said at least one RAM and to output signals to said display screen to produce an image on said display screen in response to said received signals from said CPU;
    wherein characteristic data is arranged to be stored as compressed cells in said memory, said CPU being arranged to decompress on-the-fly only data of cells needed to provide characteristic data for an image area displayed on said display screen and in accordance with a needed resolution and zoom level of said screen; and
    wherein said memory includes a correction values table for said stored compressed cells, said CPU being arranged for accessing said correction values table to correct the compressed cells values to limit absolute compression errors.

14. The device of claim 13, wherein said characteristic data comprises digital elevation data.

15. The device of claim 14, wherein said display is arranged to display an elevation profile of one of a selected road, street, trail, or track or other line feature, said elevation profile being computed by said CPU utilizing said data stored in said memory.

16. The device of claim 14, wherein said display is arranged to display an elevation profile along a line of travel, said elevation profile being computed by said CPU utilizing said data stored in said memory.

17. The device of claim 14, wherein said display is arranged to display an elevation profile at a specified angle with respect to a line of travel and at a specified distance from said position location of said display, said elevation profile being computed by said CPU utilizing said data stored in said memory.

18. The device of claim 13, wherein said digital data receiver comprises a GPS (Global Positioning System) unit, operatively connected to said CPU, said GPS unit arranged to receive GPS signals and to generate and forward a digital output to said CPU indicative of a position location of said display device in response to said received GPS signals.

19. The device of claim 13, wherein said entry device is arranged to manually enter digital data to said digital data receiver, said digital data indicative of a position location to be displayed on said display screen.

20. The device of claim 13, wherein said characteristic data is arranged to be compressed off-line prior to being stored as compressed cells in said memory.

21. The device of claim 20, wherein the compression technique is asymmetrical such that significantly more processing occurs during off-line compression than occurs during decompression by said CPU in said device.

22. The device of claim 13, wherein a compression technique is such that an RMSE (Root Mean Square Error) of compression is below a preselected value.

23. The device of claim 13, wherein said CPU is arranged to decompress characteristic data stored in said memory and to re-compute said characteristic data to a new grid parallel to a grid displayed on said display screen, said new grid having a grid step comparable with said screen size and resolution displayed on said display screen.

24. The device of claim 23, wherein said CPU is arranged to compute characteristic lines on-the-fly using said new grid.

25. A portable hand-held data display device comprising:
a CPU (Central Processing Unit);
an entry device, a memory, and at least one RAM (Random Access Memory), all operatively connected to said CPU;
a digital data receiver arranged to input digital data to said CPU indicative of a position location to be displayed on a display screen; and
a video controller and a display screen, said video controller arranged to receive signals from said CPU via said at least one RAM and to output signals to said display screen to produce an image on said display screen in response to said received signals from said CPU;
wherein characteristic data is arranged to be stored as compressed cells in said memory, said CPU being arranged to decompress on-the-fly only data of cells needed to provide characteristic data for an image area displayed on said display screen and in accordance with a needed resolution and zoom level of said screen; and
wherein said CPU is arranged to decompress characteristic data stored in said memory and to re-compute said characteristic data to a new grid parallel to a grid displayed on said display screen, said new grid having a grid step comparable with said screen size and resolution displayed on said display screen.

26. The device of claim 25, wherein said characteristic data comprises digital elevation data.

27. The device of claim 26, wherein said display is arranged to display an elevation profile of one of a selected road, street, trail, or track or other line feature, said elevation profile being computed by said CPU utilizing said data stored in said memory.

28. The device of claim 26, wherein said display is arranged to display an elevation profile along a line of travel, said elevation profile being computed by said CPU utilizing said data stored in said memory.

29. The device of claim 26, wherein said display is arranged to display an elevation profile at a specified angle with respect to a line of travel and at a specified distance from said position location of said display, said elevation profile being computed by said CPU utilizing said data stored in said memory.

30. The device of claim 25, wherein said digital data receiver comprises a GPS (Global Positioning System) unit, operatively connected to said CPU, said GPS unit arranged to receive GPS signals and to generate and forward a digital output to said CPU indicative of a position location of said display device in response to said received GPS signals.

31. The device of claim 25, wherein said entry device is arranged to manually enter digital data to said digital data receiver, said digital data indicative of a position location to be displayed on said display screen.

32. The device of claim 25, wherein said characteristic data is arranged to be compressed off-line prior to being stored as compressed cells in said memory.

33. The device of claim 32, wherein the compression technique is asymmetrical such that significantly more processing occurs during off-line compression than occurs during decompression by said CPU in said device.

34. The device of claim 25, wherein a compression technique is such that an RMSE (Root Mean Square Error) of compression is below a preselected value.

35. The device of claim 25, wherein said memory includes a correction values table for said stored compressed cells, said CPU being arranged for accessing said correction values table to correct the compressed cells values to limit absolute compression errors.

36. The device of claim 25, wherein said CPU is arranged to compute characteristic lines on-the-fly using said new grid.

37. A method of displaying data on a screen of a portable hand-held device, the method comprising:
receiving a digital output indicative of a position location to be displayed on said display device to produce an image on a display screen of the device in response to said digital output; and
storing characteristic data as compressed cells and decompressing on-the-fly only data needed to provide characteristic data for an image area displayed on said display screen;
wherein said data is arranged to be compressed using a compression technique in which an RMSE (Root Mean Square Error) of compression is below a pre-selected value.

38. The method of claim 37, wherein said characteristic data comprises digital elevation data.

39. The method of claim 38, further comprising displaying an elevation profile of one of a selected road, street, trail, or track or other line feature, said elevation profile being arranged to be computed utilizing said stored data.

40. The method of claim 38, further comprising displaying an elevation profile along a line of travel, said elevation profile being arranged to be computed utilizing said stored data.

41. The method of claim 38, further comprising displaying an elevation profile at a specified angle with respect to a line of travel and at a specified distance from said position location of said display, said elevation profile being arranged to be computed utilizing said stored data.

42. The method of claim 37, wherein receiving the digital output indicative of a position location on the display screen of the display device comprises receiving GPS (Global Positioning System) signals and generating the digital output.

43. The method of claim 37, wherein receiving the digital output indicative of a position location on the display screen of the display device comprises manually inputting digital data to said CPU indicative of a position location to be displayed on said display screen.

44. The method of claim 37, wherein said characteristic data is arranged to be compressed off-line prior to being stored as compressed cells in the device.

45. The method of claim 44, wherein said data is arranged to be compressed and decompressed with an asymmetrical compression technique such that significantly more processing occurs during off-line compression than occurs during decompression in the device.

46. The method of claim 37, further comprising storing a correction values table for said stored compressed cells, said stored correction values table being arranged to be accessed to correct the compressed cells values to limit absolute compression errors.

47. The method of claim 37, further comprising decompressing stored digital elevation data and re-computing it to a new grid parallel to a grid displayed on said display screen, said new grid having a grid step comparable with said screen size and resolution of said display screen.

48. The method of claim 37, further comprising computing characteristic lines on-the-fly using said new grid.

49. A method of displaying data on a screen of a portable hand-held device, the method comprising:
   receiving a digital output indicative of a position location to be displayed on said display device to produce an image on a display screen of the device in response to said digital output;
   storing characteristic data as compressed cells and decompressing on-the-fly only data needed to provide characteristic data for an image area displayed on said display screen; and
   storing a correction values table for said stored compressed cells, said stored correction values table being arranged to be accessed to correct the compressed cells values to limit absolute compression errors.

50. The method of claim 49, wherein said characteristic data comprises digital elevation data.

51. The method of claim 50, further comprising displaying an elevation profile of one of a selected road, street, trail, or track or other line feature, said elevation profile being arranged to be computed utilizing said stored data.

52. The method of claim 50, further comprising displaying an elevation profile along a line of travel, said elevation profile being arranged to be computed utilizing said stored data.

53. The method of claim 50, further comprising displaying an elevation profile at a specified angle with respect to a line of travel and at a specified distance from said position location of said display, said elevation profile being arranged to be computed utilizing said stored data.

54. The method of claim 49, wherein receiving the digital output indicative of a position location on the display screen of the display device comprises receiving GPS (Global Positioning System) signals and generating the digital output.

55. The method of claim 49, wherein receiving the digital output indicative of a position location on the display screen of the display device comprises manually inputting digital data to said CPU indicative of a position location to be displayed on said display screen.

56. The method of claim 49, wherein said characteristic data is arranged to be off-line prior to being stored as compressed cells in the device.

57. The method of claim 56, wherein said data is arranged to be compressed and decompressed with an asymmetrical compression technique such that significantly more processing occurs during off-line compression than occurs during decompression in the device.

58. The method of claim 49, wherein said data is arranged to be compressed using a compression technique in which an RMSE (Root Mean Square Error) of compression is below a pre-selected value.

59. The method of claim 49, further comprising decompressing stored digital elevation data and re-computing it to a new grid parallel to a grid displayed on said display screen, said new grid having a grid step comparable with said screen size and resolution of said display screen.

60. The method of claim 59, further comprising computing characteristic lines on-the-fly using said new grid.

61. A method of displaying data on a screen of a portable hand-held device, the method comprising:
   receiving a digital output indicative of a position location to be displayed on said display device to produce an image on a display screen of the device in response to said digital output;
   storing characteristic data as compressed cells and decompressing on-the-fly only data needed to provide characteristic data for an image area displayed on said display screen; and
   decompressing stored digital elevation data and re-computing it to a new grid parallel to a grid displayed on said display screen, said new grid having a grid step comparable with said screen size and resolution of said display screen.

62. The method of claim 61, wherein said characteristic data comprises digital elevation data.

63. The method of claim 62, further comprising displaying an elevation profile of one of a selected road, street, trail, or track or other line feature, said elevation profile being arranged to be computed utilizing said stored data.

64. The method of claim 62, further comprising displaying an elevation profile along a line of travel, said elevation profile being arranged to be computed utilizing said stored data.

65. The method of claim 62, further comprising displaying an elevation profile at a specified angle with respect to a line of travel and at a specified distance from said position location of said display, said elevation profile being arranged to be computed utilizing said stored data.

66. The method of claim 61, wherein receiving the digital output indicative of a position location on the display screen of the display device comprises receiving GPS (Global Positioning System) signals and generating the digital output.

67. The method of claim 61, wherein receiving the digital output indicative of a position location on the display screen of the display device comprises manually inputting digital data to said CPU indicative of a position location to be displayed on said display screen.

68. The method of claim 61, wherein said characteristic data is arranged to be compressed off-line prior to being stored as compressed cells in the device.

69. The method of claim 68, wherein said data is arranged to be compressed and decompressed with an asymmetrical compression technique such that significantly more processing occurs during off-line compression than occurs during decompression in the device.

70. The method of claim 61, wherein said data is arranged to be compressed using a compression technique in which an RMSE (Root Mean Square Error) of compression is below a pre-selected value.

71. The method of claim 61, further comprising storing a correction values table for said stored compressed cells, said stored correction values table being arranged to be accessed to correct the compressed cells values to limit absolute compression errors.

72. The method of claim 61, further comprising computing characteristic lines on-the-fly using said new grid.

73. A program storage device, readable by a machine and tangibly embodying a program of instructions executable by the machine to perform method steps for displaying data on a screen of a portable hand-held device, the method comprising:
   receiving a digital output indicative of a position location of said display device to produce an image on a display screen of the device in response to said digital output; and
   storing characteristic data as compressed cells and decompressing on-the-fly only data needed to provide characteristic data for an image area displayed on said display screen;
   wherein said data is arranged to be compressed using a compression technique in which an RMSE (Root Mean Square Error) of compression is below a pre-selected value.

74. The device of claim 73, wherein said characteristic data comprises digital elevation data.

75. The device of claim 74, the method further comprising displaying an elevation profile of one of a selected road, street, trail, or track or other line feature, said elevation profile being arranged to be computed utilizing said stored data.

76. The device of claim 74, the method further comprising displaying an elevation profile along a line of travel, said elevation profile being arranged to be computed utilizing said stored data.

77. The device of claim 74, the method further comprising displaying an elevation profile at a specified angle with respect to a line of travel and at a specified distance from said position location of said display, said elevation profile being arranged to be computed utilizing said stored data.

78. The device of claim 73, wherein receiving a digital output indicative of a position location of said display device comprises receiving GPS (Global Positioning System) signals and generating the digital output.

79. The device of claim 73, wherein receiving a digital output indicative of a position location of said display device comprises manually inputting digital data to said CPU indicative of a position location to be displayed on said display screen.

80. The device of claim 73, wherein said characteristic data is arranged to be compressed off-line prior to being stored as compressed cells in the device.

81. The device of claim 73, wherein said data is arranged to be compressed and decompressed with an asymmetrical compression technique such that significantly more processing occurs during off-line compression than occurs during decompression in the device.

82. The device of claim 73, the method further comprising storing a correction values table for said stored compressed cells, said stored correction values table being arranged to be accessed to correct the compressed cells values to limit absolute compression errors.

83. The device of claim 73, the method further comprising decompressing stored characteristic data and re-computing it to a new grid parallel to a grid displayed on said display screen, said new grid having a grid step comparable with said screen size and resolution displayed on said display screen.

84. The device of claim 83, the method further comprising computing characteristic lines on-the-fly using said new grid.

85. A program storage device, readable by a machine and tangibly embodying a program of instructions executable by the machine to perform method steps for displaying data on a screen of a portable hand-held device, the method comprising:
   receiving a digital output indicative of a position location of said display device to produce an image on a display screen of the device in response to said digital output;
   storing characteristic data as compressed cells and decompressing on-the-fly only data needed to provide characteristic data for an image area displayed on said display screen; and
   storing a correction values table for said stored compressed cells, said stored correction values table being arranged to be accessed to correct the compressed cells values to limit absolute compression errors.

86. The device of claim 85, wherein said characteristic data comprises digital elevation data.

87. The device of claim 86, the method further comprising displaying an elevation profile of one of a selected road, street, trail, or track or other line feature, said elevation profile being arranged to be computed utilizing said stored data.

88. The device of claim 86, the method further comprising displaying an elevation profile along a line of travel, said elevation profile being arranged to be computed utilizing said stored data.

89. The device of claim 86, the method further comprising displaying an elevation profile at a specified angle with respect to a line of travel and at a specified distance from said position location of said display, said elevation profile being arranged to be computed utilizing said stored data.

90. The device of claim 85, wherein receiving a digital output indicative of a position location of said display device comprises receiving GPS (Global Positioning System) signals and generating the digital output.

91. The device of claim 85, wherein receiving a digital output indicative of a position location of said display device comprises manually inputting digital data to said CPU indicative of a position location to be displayed on said display screen.

92. The device of claim 85, wherein said characteristic data is arranged to be compressed off-line prior to being stored as compressed cells in the device.

93. The device of claim 85, wherein said data is arranged to be compressed and decompressed with an asymmetrical compression technique such that significantly more processing occurs during off-line compression than occurs during decompression in the device.

94. The device of claim 85, wherein said data is arranged to be compressed using a compression technique in which an RMSE (Root Mean Square Error) of compression is below a pre-selected value.

95. The device of claim 85, the method further comprising decompressing stored characteristic data and re-computing it to a new grid parallel to a grid displayed on said display screen, said new grid having a grid step comparable with said screen size and resolution displayed on said display screen.

96. The device of claim 95, the method further comprising computing characteristic lines on-the-fly using said new grid.

97. A program storage device, readable by a machine and tangibly embodying a program of instructions executable by the machine to perform method steps for displaying data on a screen of a portable hand-held device, the method comprising:

receiving a digital output indicative of a position location of said display device to produce an image on a display screen of the device in response to said digital output;

storing characteristic data as compressed cells and decompressing on-the-fly only data needed to provide characteristic data for an image area displayed on said display screen; and decompressing stored characteristic data and re-computing it to a new grid parallel to a grid displayed on said display screen, said new grid having a grid step comparable with said screen size and resolution displayed on said display screen.

98. The device of claim 97, wherein said characteristic data comprises digital elevation data.

99. The device of claim 98, the method further comprising displaying an elevation profile of one of a selected road, street, trail, or track or other line feature, said elevation profile being arranged to be computed utilizing said stored data.

100. The device of claim 98, the method further comprising displaying an elevation profile along a line of travel, said elevation profile being arranged to be computed utilizing said stored data.

101. The device of claim 98, the method further comprising displaying an elevation profile at a specified angle with respect to a line of travel and at a specified distance from said position location of said display, said elevation profile being arranged to be computed utilizing said stored data.

102. The device of claim 97, wherein receiving a digital output indicative of a position location of said display device comprises receiving GPS (Global Positioning System) signals and generating the digital output.

103. The device of claim 97, wherein receiving a digital output indicative of a position location of said display device comprises manually inputting digital data to said CPU indicative of a position location to be displayed on said display screen.

104. The device of claim 97, wherein said characteristic data is arranged to be compressed off-line prior to being stored as compressed cells in the device.

105. The device of claim 97, wherein said data is arranged to be compressed and decompressed with an asymmetrical compression technique such that significantly more processing occurs during off-line compression than occurs during decompression in the device.

106. The device of claim 97, wherein said data is arranged to be compressed using a compression technique in which an RMSE (Root Mean Square Error) of compression is below a pre-selected value.

107. The device of claim 97, the method further comprising storing a correction values table for said stored compressed cells, said stored correction values table being arranged to be accessed to correct the compressed cells values to limit absolute compression errors.

108. The device of claim 97, the method further comprising computing characteristic lines on-the-fly using said new grid.

* * * * *